Patented Apr. 10, 1934

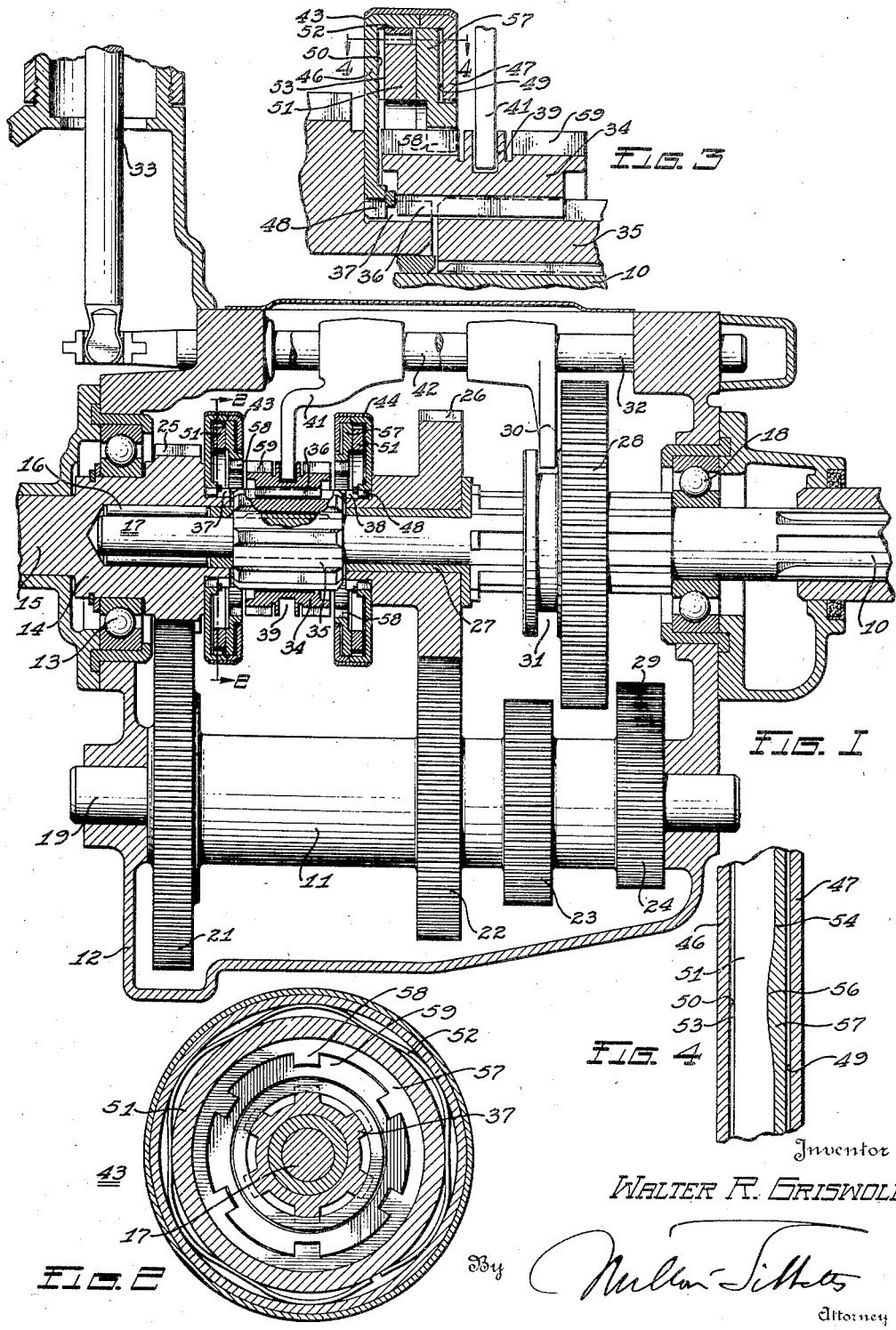

1,954,126

UNITED STATES PATENT OFFICE 1,954,126

CHANGE SPEED MECHANISM

Walter R. Griswold, Detroit, Mich., assignor to Packard Motor Car Company, Detroit, Mich., a corporation of Michigan Application September 10, 1931, Serial No. 562,074

5 Claims. (Cl. 192—53)

This invention relates to power transmission systems and more particularly to change speed mechanism.

Automobile transmission systems are frequently made up of positively driven gears or gear sets which are adapted to be arranged in various driving relations at the will of the vehicle operator. Since the drive is of a positive nature, and since, in shifting from one gear train to another, there is a speed difference between the gears which must be overcome, a quick shift is apt to be a noisy one due to clashing of the unequally moving gear teeth. Automobile drivers are more and more being called upon in congested traffic to make quick shifts, and consequently it is desirable to provide a noiseless quickly shiftable mechanism.

The shift from gear to gear is usually made by means of a gear shift lever under the manual control of the vehicle operator, and it is desirable to provide a smooth movement for this lever. Any device for permitting a noiseless quick shift, to be fully satisfactory, must not affect this smooth movement.

There have been proposed, and even adopted, several types of synchronizers, that is, devices permitting a quick noiseless shift at all gear speeds. The mechanisms in the more quiet of these are oftentimes unduly sensitive and complex in their action by virtue of the fact that they provide springs, supplementary levers, or dash-pots to control the gradual action of the braking surfaces which will cause synchronization. There are still other types of synchronizers, which make no effort to provide for a smooth and uniform movement of the gear shift lever. When shifting gears in a transmission equipped with one of these mechanisms, the vehicle operator is called upon either to pause midway of the shift, or even to stop while the synchronizing action takes place. There are some types of synchronizers on the other hand in which a continuous movement of the gear shift lever may be obtained, but only at the expense of additional force on the gear shift lever. Either a delay or the requirement of additional force is undesirable.

It is one of the objects of this invention to provide a gear synchronizer which is not subject to the objections present in the above mentioned types.

Another object of the invention is to provide a synchronizer which can be operated without causing any delay in the movement of the gear shifting lever.

Another object of the invention is to provide a synchronizer of the servo type using parts of low inertia.

Another object of the invention is to provide a cam actuated synchronizer adapted to be engageable without clash and without objectionable effort.

Other objects of the invention will appear from the following description taken in connection with the drawing, which forms a part of this specification, and in which:

Fig. 1 is a longitudinal sectional view through the transmission mechanism of a motor vehicle embodying the invention, and Fig. 2 is a section taken substantially on the line 2—2 of Fig. 1, Fig. 3 is a detail sectional view, to a larger scale, of part of the transmission shown in Fig. 1, and illustrating another position of the device, and Fig. 4 is a developed sectional view substantially on the line 4—4 of Fig. 3.

Referring to the drawing, in Fig. 1 is shown a motor vehicle transmission in which there is a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. The gear 28 may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

Thus in the illustrated embodiment of the invention, gear 28 may be moved to mesh with gear 23, to provide a first speed, or connected through pinion 29 to gear 24 to provide a reverse drive. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft between the gears 25 and 26. The clutch device, in this instance, includes a dog clutch member 34 slidably splined to a collar 35 which is pressed on shaft 10 after the assembly of the sleeve 27 and the gear 26. Internal splines 36 on the positive or dog clutch member 34 are adapted, when the member moves axially, to engage with clutch teeth 37 formed adjacent the pinion 25 on an extension of the clutch shaft portion 14, or with clutch teeth 38 formed on the hub of gear 26.

To effect the sliding or shifting movement of the positive clutch member, it is provided with a shifter groove 39 actuated by a shifter fork 41 which is connected to a shifter rod 42 similar to the rod 32 and likewise selectively operated by the gear shift lever 53.

In order to perform the clutching operation described above without shock or clash, this invention provides a synchronizing device adapted to bring the pairs of clutch teeth 36–37 or 36–38 to the same speed before positive engagement. For this purpose, a pair of synchronizing assemblies 43 and 44 are provided, each comprising an outer supporting drum, casing or braking element having parallel inturned flanges 46 and 47. One of the drums is rigidly attached to rotate with the shaft 15 and the other drum is attached to rotate with the gear 26, in a manner as shown at 48. The inner faces 49 and 50 of the drums form friction surfaces. Inside each of the drums is a friction ring element 51, frictionally held in place by a strip spring 52 which tends to prevent relative movement between the drum and the ring.

One axial side 53 of the rings forms a friction surface adapted to co-operate with the radially disposed inner face 50 of the adjacent drum member 46 and the other face of the rings is formed of axially projecting cams 54, their contour lying in a radially disposed direction. As shown in Fig. 4, these cam faces 54 are adapted to nest within oppositely formed cam faces 56 on one face of a second ring or clutch element 57, located within each adjacent drum, and normally rotating therewith. Such clutch elements are formed with inwardly projecting splines 58 which, upon axial movement of the positive clutch member 34, engage with external teeth 59 thereon and thus the synchronizer actuating members 57 are compelled to rotate with the shaft 10, whereas the friction means which includes the synchronizing drums 46 and the ring element 51 are forced to rotate with the shaft 15 or with the gear 26. The friction between the element 51 and the engaging member 46, due to the strip spring 52, tends to rotate the element 57 with the outer casing.

If, however, the driving member and the member about to be driven are not rotating uniformly, there will be relative rotation between the cam surfaces 54 and 56 and consequent axial movement of the clutch elements 51 and/or 57, which movement will continue until their combined axial length equals the axial length available within the drum 46 between the friction surfaces 49 and 50 formed thereon. When this displacement occurs, friction will be developed between the inner faces of the drum and the outer faces of the friction elements 51 and 57. This friction, of course, varies in intensity and speed of development with the difference in speed of the driving and driven members, and is self developed by the synchronizer. The co-acting friction surfaces have such a co-efficient as is necessary and if a brake lining material were used on one or both of them, the friction might be as high as would be conceivably desirable. The amount of servo-developed friction desired is, of course, under the control of the designer and I have found that satisfactory operation can be obtained without any friction lining material.

It will be noticed in the drawing that the operation of the synchronizer begins with the shifting of the positive clutch member 34 to engage first the external teeth 59 with the internal teeth 58 on the synchronizer friction element 57. This friction element having relative slight mass and therefore negligible inertia, engagement of the two sets of teeth is accomplished without objectionable gear clash. During the subsequent interval of time which further movement of the positive clutch member will require, the servo synchronizing action takes place. When the external teeth 59 on the clutch member 34 have slid axially for a short distance after engagement with the positive member of either friction clutch, internal teeth 36 will begin to engage with the clutch shaft teeth 37. The time interval required for this axial movement is, of course, under the control of the designer and in any particular case should be designed to be long enough for the proper functioning of the friction elements of the synchronizer in order that, by the time positive engagement is about to occur, the driving and driven members will be synchronized.

The angles of the cams forming the cam shaped engaging faces of the friction clutch elements 51 and 57 are designed in accordance with other factors of the synchronizer assembly. The angles should be high enough to accomplish quick axial movement of the friction element and consequent quick servo engagement of the friction surfaces and they should also be low enough to accomplish high axial pressure but not low enough to wedge, because after the operation of this device, it is necessary that the cam faced friction elements should release their axial pressure and be ready for another synchronizing action.

The drawing and the operation of this construction have described a shift from neutral to high gear or direct drive, but it will be readily understood that the shift to second gear, by which the positive clutch engages the gear 26, is accomplished in a similar manner.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a transmission, a driving member, a driven member, positive clutch means between said members, and friction clutch means between said positive clutch and the driving member; said friction clutch comprising a casing supported on one member and having a radially disposed friction surface, a clutch element engageable by the positive clutch means, and radially disposed cams between the clutch element and the casing.

2. In a transmission, a driving member, a driven member, positive clutch means between said members, and friction clutch means between said positive clutch and the driving member; said friction clutch comprising a casing supported on one member and having a radially disposed friction surface a clutch element engageable by the positive clutch means, and radially disposed cams between the clutch element and the casing, said clutch element being frictionally engageable with the casing.

3. In a motor vehicle transmission, a driving member, a driven member, a clutch device comprising a two-part element secured to one of said members, said parts being relatively displaceable, a clutch element adapted to be positively engaged by the other of said members and rotate thereupon with respect to the clutch device, and cam means rotatable with said clutch element and said device, said means being radially situated and adapted, upon relative rotation between them, to accomplish said displacement, said displacement causing a frictional engagement between the parts of the clutch device, and between the clutch element and the device.

4. In a transmission having a driving member, a driven member, and a positive clutch element shiftable to connect said members, a synchronizing means between said positive clutch element and said driving member comprising a drum having friction flanges, one of said flanges being positively connected with the driving member, a pair of friction elements in said drum having adjacent complementary cam faces one of said elements being positively engaged by the initial movement of the positive clutch element, and resilient means holding the other of said elements in rotational relation with the adjacent drum flange, the rotation of said elements relatively camming them apart axially and into frictional driving relation with the adjacent drum flanges thereby bringing the driving and driven members to the same speed prior to positive clutch connection therebetween.

5. In a transmission, a driving member having a splined end, a driven member having a splined end adjacent the splined end of the driving member, a slidable positive clutch element having internal splines engaging with the splined end of the driven member and engageable with the splined end of the driving member, a drum having end portions one of which is splined to the driving member and the other of which permits movement of the positive clutch element inwardly of the drum, and a pair of friction elements in the drum having adjacent cam faces, one of the elements having teeth with which the positive clutch element engages when initially moved toward the driving element, the engagement of the positive clutch element with said element rotating it relative to the other element and camming the elements axially into frictional engagement with the end portions of the drum.

WALTER R. GRISWOLD.